United States Patent Office 3,644,647
Patented Feb. 22, 1972

3,644,647
TREATMENT OF GLAUCOMA EMPLOYING 5-(3-METHYLAMINOPROPYL - 5H - DIBENZO[a,b] CYCLOHEPTENE
Maurice Edward Langham, Towson, Md., assignor to the United States of America as represented by the Secretary of the Department of Health, Education, and Welfare
No Drawing. Filed Dec. 13, 1967, Ser. No. 690,080
Int. Cl. A61f 9/00; A61k 27/00
U.S. Cl. 424—330
14 Claims

ABSTRACT OF THE DISCLOSURE

Ophthalmic compositions containing 5-(3-methylaminopropyl)-5H-dibenzo[a,d]cycloheptene (or the non-toxic acid addition salts thereof), hereinafter referred to as protriptyline, either singly or in combination with a sympathomimetic amine, as well as methods of treatment of disorders such as glaucoma.

BACKGROUND OF THE INVENTION (1) Field of the invention

The present invention relates to ophthalmic compositions useful in the treatment of ocular hypertension such as the disease glaucoma and other ocular disorders. More particularly, this invention relates to anti-glaucoma compositions which effectively lower mammalian intraocular pressure and to methods for the preparation and administration of such compositions.

(2) Description of the prior art

Glaucoma is a disease of the eye characterized by increased intraocular tension caused by a disruption of the normal mechanisms regulating the pressure of the eye. A great deal of progress has recently been made in understanding these mechanisms. It is now well established that aqueous humor drains from the eye through a complicated sieve-like barrier. Ocular hypertension is directly related to rate of secretion and outflow resistance of the aqueous humor, although the mechanisms of these phenomena remain to be elucidated. Manifestations of glaucoma include hardening of the globe, excavation of the optic disc and restriction of the field of vision. Glaucoma causes blindness and, in Western Man, indeed, is the leading cause of blindness.

The presently available methods of therapy for the treatment of glaucoma consist mainly of miotics, carbonic anhydrase inhibitors, and surgery. Surgery is reserved for the treatment of the less common acute congestive form of glaucoma and for those cases of chronic open angle glaucoma that do not respond to drug therapy. The carbonic anhydrase inhibitors seldom suffice as the sole means of therapy and are used in conjunction with miotics in the therapy of chronic glaucoma and as a preparatory measure to reduce intraocular pressure prior to surgery.

Thus, the mainstay of glaucoma therapy is the topical use of miotics. The most commonly employed miotic is pilocarpine. This drug has certain disadvantages in the need for frequent administration and more specifically in its causing a "pin point" pupil and an associated restriction of vision; furthermore, an excessive frequency of instillation is required, usually around the clock. Incidentally the loss of motility of the iris, as manifested by "pin point" pupil, when miotics are employed, is a pronounced disadvantage of all drugs presently employed in the treatment of glaucoma. In addition, tachphylaxis, or tolerance to the drug is not uncommon, and increasingly stronger solutions must be used. Often, tolerance develops even to the uppermost dose level available.

Therefore, there is an outstanding need for new therapeutic agents and, indeed, new approaches which can be employed in the treatment of glaucoma without the disadvantages of the presently available measures. My invention provides such an agent and a new pharmacological approach to the treatment of glaucoma.

SUMMARY OF THE INVENTION

This new approach involves the use of protriptyline a tricyclic compound heretofore known for its antidepressant properties of the following structure:

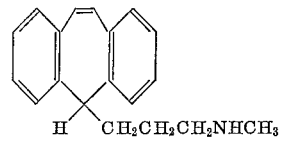

5-(3-methylaminopropyl)-5H-dibenzo[a,d]cycloheptene

I have found this compound to be effective in lowering intraocular pressure, when administered in a suitable dosage form, either singly or in combination with a sympathomimetic amine, such as epinephrine or norepinephrine. I have also found that protriptyline, applied to the mammalian eye in a relatively low concentration, is capable of dilating the pupil moderately, maintaining motility of the iris and normal response to light, as well as producing a long lasting decrease in intraocular pressure.

DETAILED DESCRIPTION OF THE INVENTION

The anti-glaucoma compositions of my invention contain 5 - (3 - methylaminopropyl)-5H-dibenzo[a,d]cycloheptene, hereinafter referred to as protriptyline, in a conventional ophthalmic vehicle and in an effective dosage range which lowers intraocular pressure. When the term "protriptyline" is used herein, it is to be understood that it is used generically and can refer to either the free base, preferably in water solubilized form, or to a non-toxic pharmaceutically acceptable acid addition salt, such as the hydrochloride or maleate. Protriptyline hydrochloride is a preferred anti-glaucoma agent of my invention.

The compositions of my invention are preferably administered topically to the eye, either in the form of ophthalmic solutions, including physiological saline and conventional ophthalmic vehicles, or as ophthalmic ointments. However, other less convenient methods of administration, such as subconjunctival injection, can be employed. The concentration of formulations are herein expressed as percent by volume and generally the concentration of protriptyline in the solution is within the range of 0.01 to 0.05 percent. Higher concentrations of solution as, for example, from about 0.2 to about 0.5 percent or lower concentrations can be employed (as, for example, in solution in combination with exogenous sympathomimetic amine), provided that the solution concentrations of protriptyline and exogenous amines are effective in lowering intraocular pressure and are non-irritating.

Initially in the treatment of glaucoma in man, the anti-glaucoma compositions of my invention are administered in unit dosage form, i.e., dropwise, three times daily. Subsequently, after the patient has responded, as determined by a sustained lowering of intraocular pressure and significant alleviation of the manifestations of glaucoma, the daily regimen may be reduced to once a day or once every other day or less, as a maintenance dose for continued effect.

Although composition of this invention, wherein protriptyline forms the only active ingredient, effectively lower intraocular tension, for some purposes it may be desirable to combine treatment with exogenous sympathomimetic amines. In one embodiment the sympathomimetic amine can be an alpha-adrenergic stimulator and is administered with the intraocular hypotensive agent of this invention in a single vehicle in dosages which effectively lower intraocular pressure. In another embodiment the sympathomimetic amine can be administered following installation of the novel hypotensive agent of this invention. Concentrations of the amine vary with the specific compound employed, but generally range from as low as 0.001 to about 2.0%. Exemplary of such sympathomimetic amines, and preferred concentrations for each, are epinephrine 0.01% to 2.0% and norepinephrine 0.01% to 2.0%. Also beta-adrenergic sympathomimetic amines, such as isoproterenol can be employed.

Thus, the percentage of active ingredient in my compositions may be varied. It is necessary that the active ingredient constitute a proportion such that a suitable dosage will be obtained. Obviously several unit dosage forms may be administered at about the same time, but, more preferably, are administered at suitable periodic intervals to result in the desired effect. Activity increases with concentration of the agent and in general I have found it desirable to maintain unit dosage concentrations below that level at which any systemic action of protriptyline is observable. Such concentrations generally fall within the above described ranges; however, it is to be understood that these general ranges may be modified in certain instances to suit the needs and responses of an individual patient. Therefore, any dose which will produce the desired effect without irritation and, furthermore, falls below the toxic dose, in most instances below the $LD_{50}$ dose of the active ingredient, can be employed. On a daily basis protriptyline can be used in dosages ranging from about .025 mg. to about 1.0 mg. and the sympathomimetic amine can be used in dosages ranging from about 0.05 mg. to about 2.0 mg.

Although protriptyline can be administered in a sterile physiological saline vehicle, it is preferred that it be formulated into an ophthalmic vehicle. Such vehicles are well known in the art and are fully described in such standard reference works as Remington's Pharmaceutical Sciences, Martin and Cook, Mack Publishing Co., Easton, Pa., 13th edition (1965). The following is a suitable example. (The percentages in the following examples refer to a percent weight by volume.)

Sterile vehicle

| | |
|---|---|
| Oxine sulfate _____percent____ | 0.01 |
| Sodium bisulfite _____do____ | 0.3 |
| Phenylmercuric acetate _____do____ | 0.002 |
| Sodium hydroxide or hydrochloric acid to pH ___ | 3.5–6 |
| Water, q.s. | |

In the foregoing composition the oxine sulfate (8-hydroxyquinolone sulfate) and the sodium bisulfite act as anti-oxidants and can vary tenfold (the former up to about 0.1% and the latter down to about 0.03%). In addition to these specific anti-oxidants, any ophthalmic anti-oxidant can be employed. These are more fully described in Remington (supra).

Phenyl mercuric acetate is employed as a preservative. Any preservative suitable for ophthalmic formulation such as those described in Remington (supra) can be employed.

Although the pH of the foregoing sterile vehicle is adjusted using base or acid it should be recognized that standard buffering agents such as those described in Remington (supra) or in the Merck Index, volume 7 (1960), so long as these buffering agents are suitable for ophthalmic formulation, can be utilized. Thus a pH range from about 3.5–8 can be employed, although pH within the physiological range is preferred. When employing a buffered system it is preferred to utilize a pH of about 6.0 to about 8. With a buffered system pH is conventionally adjusted by adjusting the concentration and, thereupon, altering the ratio of the buffered tonicity so as to maintain an isotonic solution. Although buffers can be used at varying pH, when pH is less than 6.0, sodium hydroxide or hydrochloric acid can conveniently be employed to adjust the pH. When using a buffered system it is preferred to adjust the range to that of the physiological pH range of about 6 to 7.5 or 8. U.S. Pat. 3,149,035 sets forth suitable sterile vehicles for use, especially when a catechol amine, such as epinephrine, is employed in the compositions of this invention.

The following examples illustrate various formulations of the anti-glaucoma compositions of my invention. These formulations, as well as that already given above, are intended to be illustrative only and they may be varied or modified to a considerable extent without departing from the spirit of my invention. I, therefore, do not intend to limit my invention to the specific embodiments herein set forth.

Example 1

| | Percent |
|---|---|
| Protriptyline hydrochloride _____ | 0.05 |
| Oxine sulfate _____ | 0.01 |
| Sodium bisulfite _____ | 0.3 |
| Boric acid _____ | 0.8 |
| Sodium borate _____ | 0.6 |
| Phenylmercuric acetate _____ | 0.002 |
| Water, q.s. | |

Example 2

| | Percent |
|---|---|
| Protriptyline hydrochloride _____ | 0.2 |
| Oxine sulfate _____ | 0.01 |
| Sodium bisulfite _____ | 0.3 |
| Boric acid _____ | 0.8 |
| Sodium borate _____ | 0.6 |
| Phenylmercuric acetate _____ | 0.002 |
| Water, q.s. | |

Example 3

| | Percent |
|---|---|
| Epinephrine _____ | 0.1 |
| Protriptyline hydrochloride _____ | 0.01 |
| Boric acid _____ | 0.8 |
| Sodium borate _____ | 0.6 |
| Oxine sulfate _____ | 0.01 |
| Phenylmercuric acetate _____ | 0.002 |
| Sodium bisulfite _____ | 0.3 |
| Water, q.s. | |

Example 4

| | Percent |
|---|---|
| Norepinephrine _____ | 2.0 |
| Protriptyline hydrochloride _____ | 0.01 |
| Boric acid _____ | 0.8 |
| Sodium borate _____ | 0.6 |
| Oxine sulfate _____ | 0.01 |
| Phenylmercuric acetate _____ | 0.002 |
| Sodium bisulfite _____ | 0.3 |
| Water, q.s. | |

The compositions of this invention can also be administered as ophthalmic ointments. These are compounded, for example, by mixing finely milled powdered ingredients with a small amount of white petrolatum and levigating or otherwise mixing until a uniform distribution is achieved. The balance of white petrolatum is added by geometric addition until the desired dosage form is made.

The compositions of my invention have been tested in standard laboratory animals and found to possess the capability of lowering mammalian intraocular pressure and producing mydriasis. For example, the effect of a 0.2 percent physiological saline solution of protriptyline hydrochloride applied topically to the cornea of the conscious rabbit unilaterally every 30 min. is summarized in Table 1.

TABLE 1

[The effect of protriptyline hydrochloride applied topically on the pupil diameter and intraocular pressure of conscious rabbits]

| Time (min.) | Pupil diameter (mm.) | | | Intraocular pressure (mm. Hg) | | |
|---|---|---|---|---|---|---|
| | Control | Experimental | E-C | Control | Experimental | E-C |
| 0 | 6.5±0.3 | 6.3±0.3 | 0.2±0.2 | 18.3±0.6 | 18.3±0.5 | 0.0±0.2 |
| 30 | 6.5±0.3 | 8.8±0.4 | 2.3±0.3 | 18.3±0.6 | 18.0±0.5 | −0.3±0.2 |
| 60 | 6.5±0.4 | 9.0±0.4 | 2.5±0.4 | 18.5±0.6 | 17.7±0.6 | −0.8±0.2 |
| 120 | 6.5±0.4 | 9.8±0.3 | 3.3±0.3 | 18.3±0.5 | 16.0±0.6 | −2.3±0.3 |
| 180 | 6.3±0.3 | 11.2±0.4 | 4.9±0.4 | 18.3±0.6 | 15.0±0.5 | −3.3±0.3 |
| 240 | 6.5±0.3 | 9.8±0.4 | 3.3±0.3 | 18.7±0.6 | 15.3±0.6 | −3.4±0.2 |
| 300 | 6.3±0.2 | 9.2±0.4 | 2.9±0.3 | 18.2±0.6 | 15.2±0.7 | −3.0±0.3 |

NOTE.—Six rabbits were used in this experiment. E-C represents the mean difference between the control and the experimental eyes of individual rabbits. 50 μl. of a 0.2 percent solution of protriptyline hydrochloride was applied to the experimental eyes every 30 min.

Anisocoria was apparent in the treated animal within 15 min., and the monocular dilatation was maximal (4.1±0.4 mm.) in about 2 hr. A decrease in intraocular pressure also was observed, although significant changes were not seen until 60 to 120 min. after initiation of the experiment. Under similar conditions a 0.1% solution of protriptyline hydrochloride was found sufficient to cause a pipul dilatation of 2.5±0.4 mm. in the treated eyes of 5 rabbits. A 0.05 percent solution of protriptyline hydrochloride applied topically caused a small and variable dilatation of the pupil, and 0.01 percent caused no observable effect on either pupil dilatation or intraocular pressure. The extent of the pupil response to 0.2 percent solution of protriptyline applied topically appeared to be maximal, because increasing the concentration to 0.5 percent did not further increase the response of pupil or intraocular pressure.

The effects of protriptyline hydrochloride (50 μl. of 0.2% and 0.05% solutions in physiological saline, respectively) applied topically to the cornea of the conscious monkey are summarized in Tables 2 and 3.

50 μl. of 0.2 percent solution of protriptyline caused marked pupil dilatation and a significant decrease in intraocular pressure. A slight dilatation of the pupil and a significant decrease in pressure also resulted from 0.05 percent protriptyline. In the latter experiment it was found that the ocular effects could be sustained over a 10-day period by the administration of 50 μl. twice daily. Omitting the protriptyline on the fifth and sixth day still left a significant mydriasis, but little if any ocular hypotony, on the 7th day. Thus, protriptyline given topically can cause a sustained effect in monkeys. The pressure decrease in the treated eyes was significant in all eyes, and it represented a significant percentage change in the outflow pressure.

All the animals in the experiments set forth in Tables I to III possesses an intact ocular sympathetic nerve supply. The hypotensive response of the eye to protriptyline has been shown to be dependent thereon, since either denervation or alpha-adrenergic blockade abolished the effect of protriptyline. Because of the effect of the compound protriptyline on the sympathetic nervous system in the eye and the fact that protriptyline potentiates this sympathetic nerve activity, thereby modifying the intravascular and the intraocular fluid circulations and the fact that protrip-

TABLE 2

[The effect of 0.2% solution of protriptyline/hydrochloride applied topically on the pupil diameter and the intraocular pressure of adult rhesus monkeys]

| Time (hr.) | Pupil diameter | | | Intraocular pressure | | |
|---|---|---|---|---|---|---|
| | Right eye | Left eye | R-L | Right eye | Left eye | R-L |
| | (Untreated control animals) | | | (Untreated control animals) | | |
| 0 | 4.2±0.2 | 4.2±0.3 | 0.0±0.5 | 18.4±1.7 | 18.9±1.6 | −0.5±0.5 |
| 1 | 4.5±0.4 | 4.5±0.3 | 0.0±0.2 | | | |
| 3.5 | 4.4±0.4 | 4.2±0.3 | 0.2±0.5 | 15.7±1.3 | −16.8±1.3 | −1.1±0.8 |
| 5 | 4.9±0.2 | 4.6±0.2 | 0.3±0.2 | 17.1±1.6 | 17.3±1.8 | −0.2±0.5 |
| | Control eye | Exp. eye | E-C | Control eye | Exp. eye | E-C |
| | (Untreated vs. treated eye) | | | (Untreated vs. treated eye) | | |
| 0 | 3.8±0.3 | 4.1±0.3 | 0.2±0.2 | 20.7±0.8 | 20.9±0.7 | −0.1±0.4 |
| 1 | 3.8±0.3 | 5.0±0.2 | 1.2±0.1 | | | |
| 2 | 3.9±0.2 | 5.3±0.3 | 1.4±0.2 | | | |
| 4 | 3.4±0.2 | 5.8±0.5 | 2.5±0.5 | 21.8±0.6 | 21.0±0.8 | −0.8±0.7 |
| 5 | 3.4±0.4 | 6.9±0.6 | 3.2±0.6 | 20.0±1.3 | 16.5±2.3 | −3.6±3.3 |
| 28 | 3.2±0.1 | 5.3±0.3 | 2.2±0.3 | 18.4±1.1 | 14.4±0.8 | −4.0±1.3 |

NOTE.—Series I summarizes the average pupil diameters and intraocular pressure of a group of six untreated adult rhesus monkeys. Series II summarizes the pupil diameter and intraocular pressure of six adult rhesus monkeys given 50 μl. of a 0.2% solution of protriptyline to one eye at time T=0, 1, and 4 hr. Note that 24 hr. after the last application of protriptyline there was still significant pupillary dilatation and decreased intraocular pressure in the treated eyes.

TABLE 3

[The effect of 0.05% solution of protriptyline hydrochloride applied topically on the pupil diameter and the intraocular pressure of six adult rhesus monkeys]

| Time (days) | Pupil diameter (mm.) | | | Intraocular pressure (mm. Hg) | | |
|---|---|---|---|---|---|---|
| | Control | Experimental | E-C | Control | Experimental | E-C |
| 0 | 4.2±0.2 | 4.2±0.2 | 0.0±0.0 | 18.9±1.6 | 18.4±1.7 | −0.5±0.6 |
| 1 | 3.6±0.2 | 4.4±0.1 | 0.8±0.1 | 17.0±1.1 | 13.6±0.9 | −3.3±0.6 |
| 3 | 3.4±0.2 | 4.2±0.2 | 0.8±0.2 | 16.6±0.6 | 14.1±1.2 | −2.5±0.5 |
| 4 | 3.7±0.2 | 4.5±0.3 | 0.8±0.3 | 18.7±1.1 | 14.4±0.6 | −4.3±0.7 |
| 7 | 3.9±0.1 | 4.4±0.2 | 0.5±0.1 | 15.7±0.7 | 14.8±0.9 | −1.0±0.8 |
| 8 | 3.3±0.3 | 4.1±0.3 | 0.8±0.5 | 19.4±2.3 | 15.1±1.1 | −4.3±1.2 |
| 10 | 3.9±0.2 | 4.9±0.2 | 1.0±0.2 | 22.9±1.6 | 17.5±0.9 | −5.7±1.3 |

NOTE.—The group of six adult rhesus monkeys were given 1 drop of a 0.05% solution of protriptyline 3 times daily to one eye (experimental). No drops were given on day 5 and 6 but drops were resumed on day 7 after making the pupillary and intraocular pressure measurements. Animals were injected with phencyclidine (1–2 mg./kg.) intramuscularly each day prior to taking the measurements.

tyline potentiates the adrenergic transmitter released by the sympathetic nerve supply to the eye, the compounds and methods of this invention therefore have applicability to the treatment of other ocular disorders. Therefore the compositions and methods of this invention are useful in the treatment of other disorders of the eye involving such circulation. For example, (a) the prevention of primary retinal detachment by re-establishment of a normal intraocular fluid circulation, (b) prevention of dry eye (keratitis sicca) by increasing the tear flow, and (c) modification of ocular motility in the treatment of muscle imbalance as found in squint.

It has also been established that topical administration of .05 percent solution of protriptyline will cause pupil dilatation, reduction of intraocular pressure associated with a decrease in aqueous humor formation and an increase in outflow facility in the eye of normal and glaucomatous human subjects.

I claim:

1. An ophthalmic composition for the treatment of glaucoma comprising a topical ophthalmic vehicle, an ophthalmic antioxidant and about 0.01% to about 0.5% weight by volume of 5-(3-methylaminopropyl)-5H-dibenzo-[a,d]cycloheptene.

2. The composition of claim 1 wherein the amount is from about 0.01% to about 0.05% weight by volume.

3. The composition of claim 1 wherein said vehicle is physiological saline.

4. The composition of claim 1 wherein said vehicle is an isotonic solution buffered at pH 3.5 to 8.

5. The composition of claim 1 wherein said vehicle is an ophthalmic ointment.

6. A method for treating glaucoma which comprises topically admniistering to the eye of a patient afflicted with glaucoma a sufficient amount of 5-(3-methylaminopropyl)-5H-dibenzo[a,d]cycloheptene to produce a lowering of intraocular pressure.

7. A method for lowering intraocular pressure which comprises topically administering to the eye an effective amount of 5 - ( 3 - methylaminopropyl)-5H-dibenzo[a,d]cycloheptene.

8. The method of claim 6 wherein the concentration of said compound is about 0.01% to about 0.5% weight by volume.

9. The method of claim 6 wherein the concentration of said compound is about 0.01% to about 0.05% weight by volume.

10. The method of claim 8 wherein said topical ophthalmic vehicle is physiological saline.

11. The method of claim 8 wherein said topical ophthalmic vehicle is an isotonic solution buffered at pH 3.5 to 8.

12. The method of claim 8 wherein said topical ophthalmic vehicle is an ophthalmic ointment.

13. An ocular hypotensive composition for the treatment of glaucoma comprising a topical ophthalmic vehicle, about 0.01% to about 0.5% weight by volume of 5-(3-methylaminopropyl) - 5H-dibenzo[a,d]cycloheptene and about 0.001% to about 2.0% weight by volume of a sympathomimetic amine selected from the group consisting of epinephrine, norepinephrine and isoproterenol.

14. A method for treating glaucoma which comprises applying topically to the eye of a person suffering with glaucoma a sufficient amount of a composition comprising a topical ophthalmic vehicle, about 0.01% to about 0.5% weight by volume of 5-(3-methylaminopropyl)-5H-dibenzo[a,d]cycloheptene and about 0.001% to about 2.0% weight by volume of a sympathomimetic amine selected from the group consisting of epinephrine, norepinephrine and isoproterenol, to produce a lowering of intraocular pressure.

References Cited

UNITED STATES PATENTS

| | | | |
|---|---|---|---|
| 2,735,799 | 2/1956 | Abramson | 424—330 |
| 3,149,035 | 9/1964 | Riegelman | 424—330 |
| 3,258,488 | 6/1966 | Judd et al. | 260—570.8 TC |
| 3,312,738 | 4/1967 | Tishler et al. | 424—330 |

OTHER REFERENCES

Remington's Pharm. Sciences, 13th ed., 1965, p. 919.

STANLEY J. FRIEDMAN, Primary Examiner

V. D. TURNER, Assistant Examiner